United States Patent
Byon

(10) Patent No.: US 11,978,017 B2
(45) Date of Patent: *May 7, 2024

(54) SYSTEMS AND METHODS FOR DETECTING ERRORS OF ASYNCHRONOUSLY ENQUEUED REQUESTS

(71) Applicant: Coupang Corp., Seoul (KR)

(72) Inventor: PyongAn Byon, Seoul (KR)

(73) Assignee: Coupang Corp., Seoul (KR)

( * ) Notice: Subject to any disclaimer, the term of this patent is extended or adjusted under 35 U.S.C. 154(b) by 504 days.

This patent is subject to a terminal disclaimer.

(21) Appl. No.: 17/228,985

(22) Filed: Apr. 13, 2021

(65) Prior Publication Data
US 2022/0122039 A1    Apr. 21, 2022

Related U.S. Application Data

(63) Continuation of application No. 17/072,196, filed on Oct. 16, 2020, now Pat. No. 11,010,719.

(51) Int. Cl.
*G06Q 10/10* (2023.01)
*G06F 9/455* (2018.01)
(Continued)

(52) U.S. Cl.
CPC ....... *G06Q 10/103* (2013.01); *G06F 9/45558* (2013.01); *G06F 9/505* (2013.01);
(Continued)

(58) Field of Classification Search
CPC .......... G06Q 10/103; G06Q 10/06315; G06Q 10/06316; G06Q 10/0639; G06Q 10/0833;
(Continued)

(56) References Cited

U.S. PATENT DOCUMENTS

| 10,775,976 B1 | 9/2020 | Abdul-Jawad et al. |
| 2015/0379424 A1* | 12/2015 | Dirac ..................... G06N 20/00 706/12 |

(Continued)

FOREIGN PATENT DOCUMENTS

| CN | 111611050 A | 9/2020 |
| CN | 111666145 A | 9/2020 |

(Continued)

OTHER PUBLICATIONS

Korean Intellectual Property Office Notice of Preliminary Rejection in counterpart Application No. 10-2021-7018599 dated Mar. 24, 2022 (5 pages).

(Continued)

*Primary Examiner* — Kenneth Tang
(74) *Attorney, Agent, or Firm* — FINNEGAN, HENDERSON, FARABOW, GARRETT & DUNNER, LLP

(57) ABSTRACT

A system for managing a client request is described herein, which may have at least one processor and a non-transitory computer-readable medium containing a set of instructions executable by the at least one processor. Execution of these instructions may cause the processor to perform steps of: validating a client request received from a remote client device, the client request including request data; transmitting, based on the validating, a response to the remote client device; based on the request data, determining a queue for the client request; asynchronously enqueuing the client request in the queue, the queue being configured to analyze the client request according to a model; analyzing the client request; and based on analyzing the client request, performing a responsive action.

20 Claims, 14 Drawing Sheets

(51) Int. Cl.

| | |
|---|---|
| *G06F 9/50* | (2006.01) |
| *G06F 11/14* | (2006.01) |
| *G06F 16/28* | (2019.01) |
| *G06Q 10/0631* | (2023.01) |
| *G06Q 10/0639* | (2023.01) |
| *G06Q 10/0833* | (2023.01) |
| *G06Q 10/087* | (2023.01) |
| *G06Q 30/018* | (2023.01) |
| *G06Q 30/0601* | (2023.01) |
| *H04L 67/60* | (2022.01) |
| *G06F 3/0482* | (2013.01) |
| *G06Q 10/105* | (2023.01) |
| *G06Q 10/1091* | (2023.01) |

(52) U.S. Cl.
CPC ........ *G06F 11/1415* (2013.01); *G06F 16/284* (2019.01); *G06Q 10/06315* (2013.01); *G06Q 10/06316* (2013.01); *G06Q 10/0639* (2013.01); *G06Q 10/0833* (2013.01); *G06Q 10/087* (2013.01); *G06Q 30/0185* (2013.01); *G06Q 30/0625* (2013.01); *G06Q 30/0633* (2013.01); *G06Q 30/0641* (2013.01); *H04L 67/60* (2022.05); *G06F 3/0482* (2013.01); *G06F 2009/45562* (2013.01); *G06F 2201/805* (2013.01); *G06Q 10/105* (2013.01); *G06Q 10/1091* (2013.01)

(58) Field of Classification Search
CPC ............. G06Q 10/087; G06Q 30/0185; G06Q 30/0625; G06Q 30/0633; G06Q 30/0641; G06Q 10/105; G06Q 10/1091; G06Q 10/083; G06F 9/45558; G06F 9/505; G06F 11/1415; G06F 16/284; G06F 3/0482; G06F 2009/45562; G06F 2201/805; G06F 11/0709; G06F 11/0751; G06F 11/0766; G06F 11/1438; G06F 11/1479; G06F 11/3409; G06F 11/3476; H04L 67/60; H04L 63/029; H04W 4/35
See application file for complete search history.

(56) References Cited

U.S. PATENT DOCUMENTS

| | | | |
|---|---|---|---|
| 2019/0026634 A1 | 1/2019 | Homeyer et al. | |
| 2019/0095510 A1* | 3/2019 | Cruise | G06F 16/24568 |
| 2019/0130327 A1 | 5/2019 | Carpenter et al. | |
| 2020/0014642 A1* | 1/2020 | Sidi | H04M 3/5141 |
| 2020/0050968 A1* | 2/2020 | Lee | G06N 20/00 |
| 2020/0242645 A1 | 7/2020 | Kancharla et al. | |
| 2020/0303060 A1* | 9/2020 | Haemel | G06N 3/082 |
| 2020/0387954 A1* | 12/2020 | Sadhankar | G06Q 20/12 |
| 2021/0012417 A1* | 1/2021 | Atieque | G06Q 20/24 |
| 2022/0027915 A1* | 1/2022 | Cameron | G06Q 20/12 |
| 2022/0051181 A1* | 2/2022 | Yacoub | G06Q 10/06 |
| 2022/0067085 A1* | 3/2022 | Nihas | G06Q 10/0875 |
| 2022/0076306 A1* | 3/2022 | Toren | G06Q 30/0605 |
| 2022/0083954 A1* | 3/2022 | Starostenko | G06Q 10/087 |
| 2022/0276904 A1* | 9/2022 | Kinney, Jr. | G06F 9/4881 |

FOREIGN PATENT DOCUMENTS

| | | |
|---|---|---|
| TW | 201810026 A | 3/2018 |
| WO | WO 2008/127748 A1 | 10/2008 |

OTHER PUBLICATIONS

Search Report and Written Opinion in counterpart Application No. PCT/IB2020/060036 dated Jul. 14, 2021 (9 pages).

Examination Notice in counterpart Hong Kong Application No. 22021031640.6 dated Jun. 2, 2022 (9 pages).

Notice of Allowance and Search Report issued in counterpart Taiwanese Application No. 110115219 dated May 3, 2022 (3 pages).

Hong Kong Examination Notice dated Aug. 31, 2023, in counterpart Application No. 22021031640.6 (6 pages).

Korean Intellectual Property Office Notice of Preliminary Rejection in counterpart Application No. 10-2021-7018599 dated Oct. 25, 2021 (8 pages).

* cited by examiner

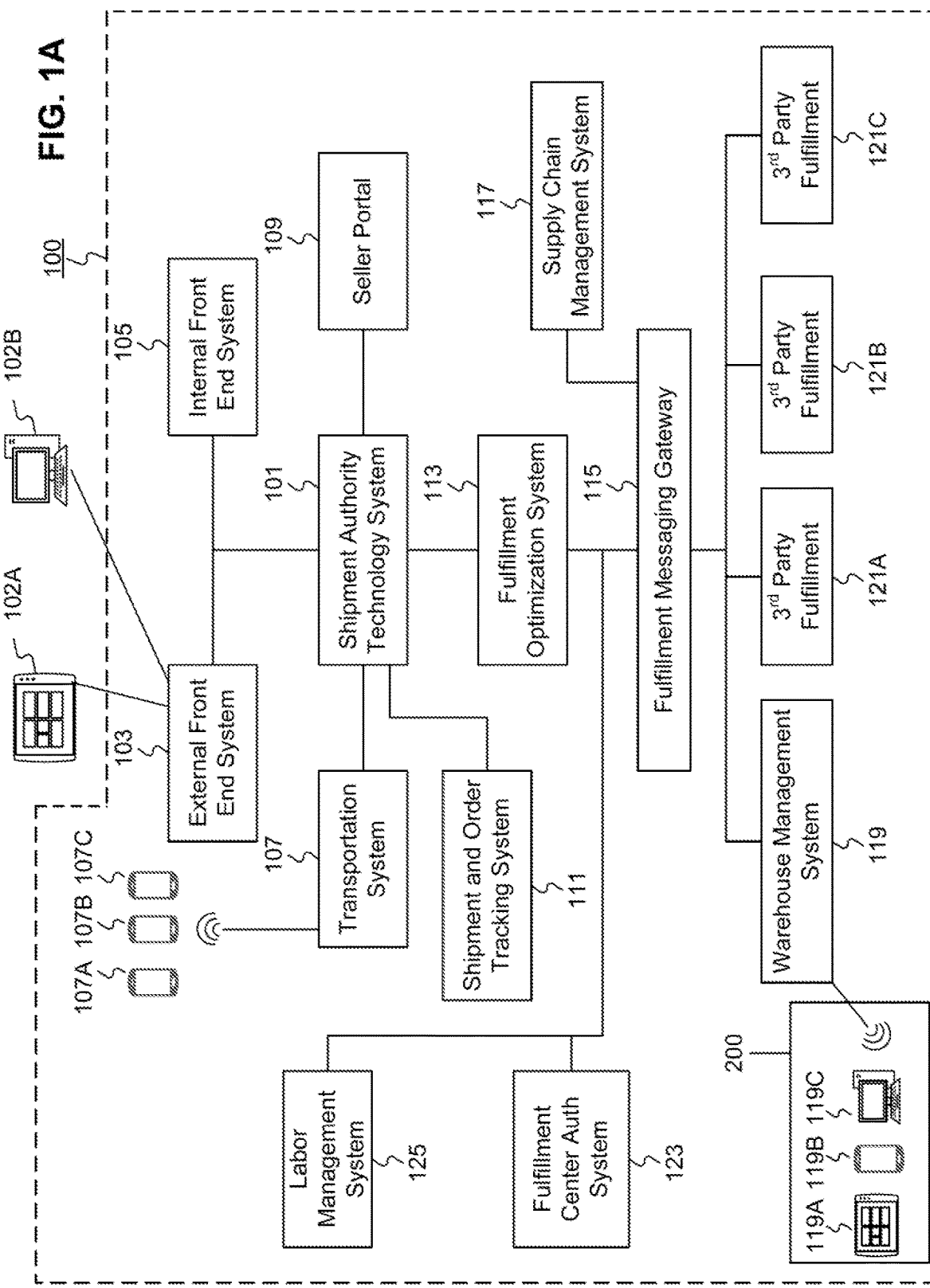

SYSTEMS AND METHODS FOR DETECTING ERRORS OF ASYNCHRONOUSLY ENQUEUED REQUESTS

CROSS-REFERENCE TO RELATED APPLICATIONS

This application is a continuation of U.S. patent application Ser. No. 17/072,196, filed on Oct. 16, 2020, currently pending and allowed, the disclosure of which is expressly incorporated herein by reference in its entirety.

TECHNICAL FIELD

The present disclosure generally relates to computerized systems and methods for managing client requests. In particular, embodiments of the present disclosure relate to inventive and unconventional systems relate to using asynchronous queuing and error analysis to handle remote client requests relating to shipping networks.

BACKGROUND

In the area of fulfilling customer orders for products, systems are used to handle issues that may arise after an individual has placed an order. For example, a customer may decide to return, exchange, or cancel an item, which may be at any of a number of particular stages of processing or shipping. With fulfillment services moving extremely quickly to satisfy customer demand, fast and efficient processing of customer requests is important to ensuring high fulfillment throughput, minimal strain on computing resources, and maintaining customer satisfaction.

Current systems for handling customer requests are rigidly designed and lack sophisticated means for detecting and responding to errors. Traditional techniques often involve synchronously enqueuing requests from client devices, which can lead to unnecessary temporary loss of capabilities in a client device application. Synchronous requests often involve sequences of API calls and responses that must be followed in a particular order, where failure of any particular call or response results in a failure of the entire process, and a corresponding customer request may be lost. Such techniques also frequently fail to understand the nature of client request errors, rapidly alleviating these errors, and providing a detailed understanding of errors to client devices. Some current systems also do not determine intermediate request statuses and provide these to customers, which could assuage customer concerns and reduce the number of inquiries and complaints placed by customers on other systems, which create further strain on computing resources.

Therefore, there is a need for improved methods and systems for asynchronously handling client requests while dynamically detecting and responding to errors and pinpointing request status details for providing to client devices.

SUMMARY

One aspect of the present disclosure is directed to a system for managing a client request. In some embodiments, the system may comprise at least one processor and a non-transitory computer-readable medium containing a set of instructions executable by the at least one processor. In some embodiments the instructions may cause the processor to perform steps comprising: validating a client request received from a remote client device, the client request including request data; transmitting, based on the validating, a response to the remote client device; based on the request data, determining a queue for the client request; asynchronously enqueuing the client request in the queue, the queue being configured to analyze the client request according to a model; analyzing the client request; and based on analyzing the client request, performing a responsive action.

In some embodiments, the steps may comprise: based on analyzing the client request, determining a performance indicator of the model; determining a modification to the model based on the performance indicator; and transmitting a notification of the determined modification to a manager device.

In some embodiments, the steps may comprise: receiving a modification request for a model; and modifying the model based on the modification request.

In some embodiments, the client request may be a first client request and the responsive action may comprise storing domain data based on the first client request in a relational database, the relational database storing domain data from a second client request.

In some embodiments, the responsive action comprises modifying a parameter of the model.

In some embodiments, the parameter may be modified based on the domain data from the first and second client requests.

In some embodiments, the steps may comprise: determining a resource usage of computing device; and scaling an amount of a resource for handling the client request based on the determined resource usage.

In some embodiments, the steps may comprise scaling the amount of the resource comprises initializing a virtual computing resource.

In some embodiments, validating the client request may comprise: extracting the request data from the client request; and analyzing the request data using a rule engine.

In some embodiments, the steps may comprise transmitting, to the remote client device, a notification based on analyzing the client request using the rule engine, the notification comprising an indication of success or failure of the validating.

In some embodiments, determining the queue may comprise parsing a header of the client request to determine a client request topic; comparing the client request topic to a sequence of queue topics; and determining that the client request topic matches a topic of the determined queue in the sequence of queue topics.

In some embodiments, analyzing the client request may comprise: attempting, at a first time, a task of the queue; determining a first failure of the attempting at the first time; attempting, at a second time, the task according to a designated number of re-attempts for the task; determining a second failure of attempting at the second time; based on the second failure, transmitting failure data to a failure information device; and transmitting a failure response to the remote client device.

In some embodiments, the model may comprise a configurable workflow.

In some embodiments, analyzing the client request may comprise: attempting a task of the queue; determining a failure of the task; and transmitting failure information to the remote client device based on the determined failure, the failure information identifying the task.

In some embodiments, the request data may comprise an item identifier; and analyzing the client request may comprise: querying an inventory system using the item identifier;

receiving a response from the inventory system; and determining a corrective action based on the inventory system response.

Another aspect of the present disclosure is directed to a method for managing a client request, comprising: validating a client request received from a remote client device, the client request including request data; transmitting, based on the validating, a response to the remote client device; based on the request data, determining a queue for the client request; asynchronously enqueuing the client request in the queue, the queue being configured to analyze the client request according to a model; analyzing the client request; and based on analyzing the client request, performing a responsive action.

In some embodiments, the method may comprise: based on analyzing the client request, determining a performance indicator of the model; determining a modification to the model based on the performance indicator; and transmitting a notification of the determined modification to a manager device.

In some embodiments, analyzing the client request may comprise: attempting a task of the queue; determining a failure of the task; and transmitting failure information to the remote client device based on the determined failure, the failure information identifying the task.

In some embodiments, the model may comprise a configurable workflow.

Yet another aspect of the present disclosure is directed to a system for managing a client request, which may comprise a first computing device comprising at least one processor and a non-transitory computer-readable medium and a second computing device comprising at least one processor and a non-transitory computer-readable medium.

In some embodiments, the non-transitory computer-readable medium of the first computing device may contain a set of instructions that, when executed by the at least one processor of the first computing device, cause the processor to perform steps comprising: validating a client request received from a remote client device, the client request including request data comprising an item identifier; transmitting, based on the validating, a response to the remote client device; based on the request data, determining, among a plurality of queues having associated computing devices, a queue for the client request; and asynchronously enqueuing the client request in the queue, the queue being configured to analyze the client request according to the modified model.

In some embodiments, the non-transitory computer-readable medium of the second computing device may contain a set of instructions that, when executed by the at least one processor of the second computing device, cause the processor to perform steps comprising: analyzing the client request according to the modified model by: querying an inventory system using the item identifier; receiving a response from the inventory system; and determining a corrective action based on the inventory system response; based on analyzing the client request, determining a performance indicator of the model; determining a modification to the model based on the performance indicator; and transmitting a notification of the determined modification to a manager device.

Other systems, methods, and computer-readable media are also discussed herein.

BRIEF DESCRIPTION OF THE DRAWINGS

FIG. 1A is a schematic block diagram illustrating an exemplary embodiment of a network comprising computerized systems for communications enabling shipping, transportation, and logistics operations, consistent with the disclosed embodiments.

DETAILED DESCRIPTION

Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Display Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for handling client requests.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), 3rd party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and checkout information from a timekeeping system, such as a timekeeping system operated on a device 119A-119C.

3$^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
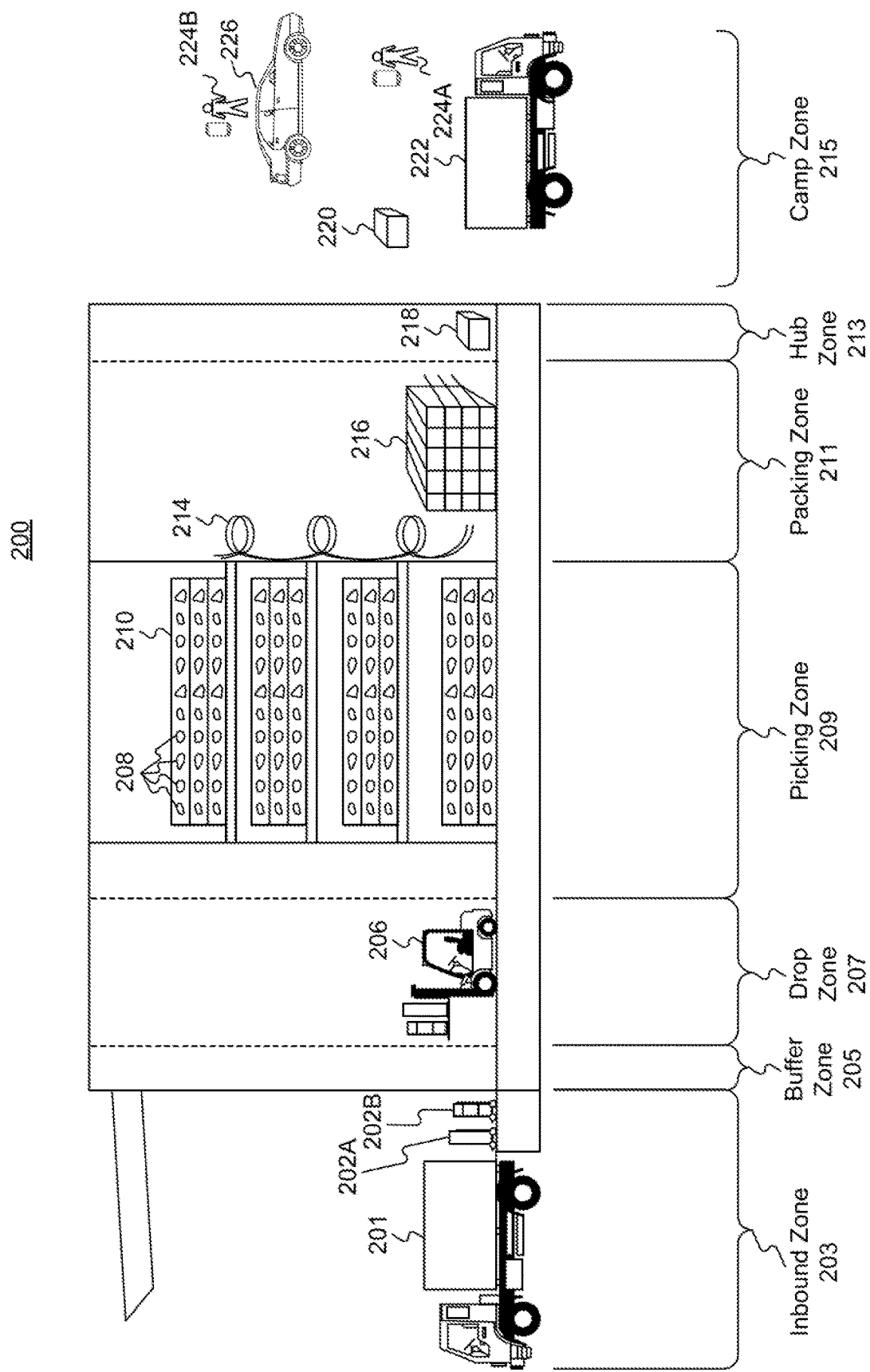
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3A:
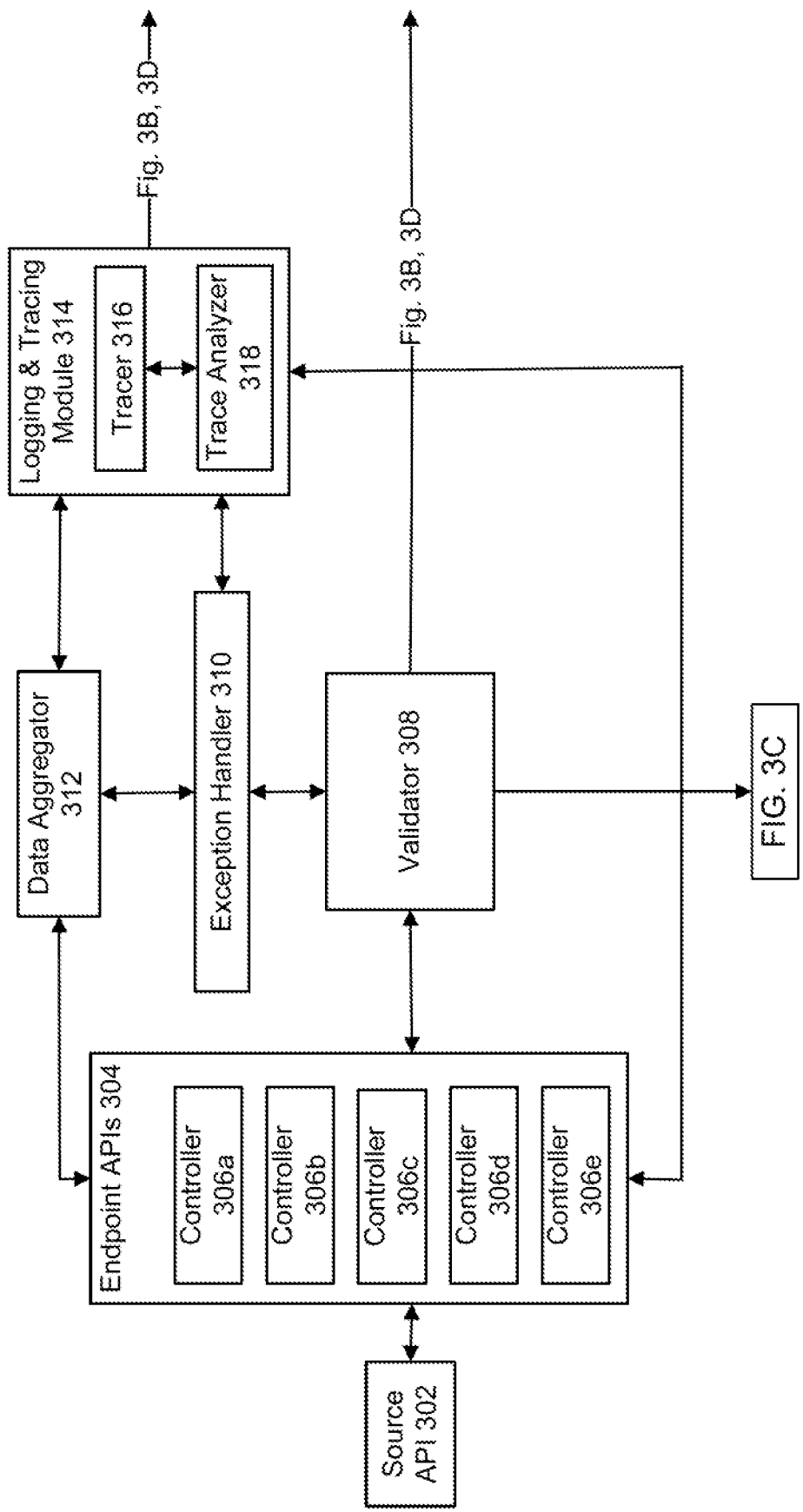
FIG. 3A illustrates an exemplary pictographic representation of an intake sub-system 300.

FIG. 3A illustrates an exemplary pictographic representation of an intake sub-system 300. Intake sub-system 300 may be designated for initial processing of a communication from a source application program interface (API) 302. Source API 302 may be any one of a number of APIs, which may be specifically configured for use by a consumer, a delivery-person, an administrator, and/or a seller. Source API 302 may be implemented on a computing device having a processor, memory component, and/or communications component, such as a mobile device, a desktop computer, an adapter, a controller, a server, or any other device capable of sending and/or receiving API communications. In some embodiments, intake sub-system 300 and/or components of intake sub-system 300 may be communicably coupled to other sub-systems (e.g., as described in FIGS. 3B-3D).

Intake sub-system 300 may also include a number of endpoint APIs 304, to which source API 302 may be communicably coupled. In some embodiments, endpoint APIs 304 may only be a single endpoint API. Endpoint APIs 304 may include a plurality of controllers, adapters, and/or other computing devices, which may be managed by an API provider (not shown). For example, endpoint APIs 304 may be implemented by a combination of controllers, such as controller 306a, controller 306b, controller 306c, controller 306d, and/or controller 306e. In some embodiments, a controller may be designated for handling operations for a particular entity (e.g., a seller). A controller may be a hardware device or a software program, which may manage dataflows between different entities (e.g., between source API 302 and data aggregator 312). For example, a controller may be, without limitation, a flash controller, an application delivery controller, a primary domain controller, a baseboard management controller, and/or a session border controller. In some embodiments, a communication from source API 302 may be directed to a specific endpoint API or controller based on a source associated with the communication. For example, an API provider may receive a communication from a source API 302 and may determine (e.g., based on a message identifier, Internet Protocol (IP) address, Media Access Control (MAC) address, communication format, and/or other unique identifier) a source and/or type of the communication. Based on the identified communication source and/or communication type, the API provider may direct the communication to a particular controller, which may be configured for communications of having a particular source and/or type. By way of further example, API provider may determine that a communication from source API 302 has a consumer device as its communication source and a return request as its communication type, and may direct the communication to an endpoint API 304 (e.g., controller 306b), which may be configured for handling communications having a source and/or type of the received communication (e.g., configured for return request communications).

Intake sub-system 300 may also include a validator 308, which may validate communications from a source API 302, and may be communicably coupled to endpoint APIs 304. Validator 308 may exist within an endpoint API 304 (e.g., as part of a controller), or may exist as a separate component, such as a server, to which an endpoint API 304 may be connected. Validator 308 may include various components (e.g., modules, devices, processors, etc.) configured to carry out a validation process (e.g., a process for validating communications received from a source API 302). For example, validator 308 may include a validator invoker, a validation pre-processor (e.g., for re-formatting data from a communication), a validator processor (e.g., for performing validation operations to data), a validator post-processor (e.g., for re-formatting validated data to a format understandable by another entity, such as rule engine 362 in FIG.

3C), a validation manager, and/or a message publisher (which may direct messages to another sub-system).

Intake sub-system 300 may also include an exception handler 310, to which validator 308 may be communicably coupled. Exception handler 310 may be part of validator 308, or may be a separate device or component, such as a server or mobile device. In some embodiments, validator 308 may direct a communication to exception handler 310 based on a validation result of a communication, which may have been determined by validator 308. For example, if a communication fails at least one rule or algorithm implemented by validator 308, validator may direct the communication to exception handler 310. In some embodiments, exception handler 310 may be configured re-format, split, parse, tag, and/or otherwise re-configure or transmit information from the communication (e.g., issuing an alert to an administrator device) based on the at least one rule or algorithm failed by the communication. Exception handler 310 may be communicably coupled to a data aggregator 312 and/or a logging & tracing module 314.

Intake sub-system 300 may also include a data aggregator 312, which may aggregate data from different sources, such as endpoint APIs 304, exception handler 310, and/or logging & tracing module 314. Data aggregator 312 may be communicably coupled to any device and/or component of sub-system 300, as well as devices and/or components of other systems including sub-systems 325 in FIG. 3B, 355 in FIG. 3C, and 375 in FIG. 3D. Data aggregator 312 may be part of a device having another purpose (e.g., validator 308), or may be a separate device or component, such as a server or mobile device. In some embodiments, data aggregator 312 may include various components (e.g., modules, devices, processors, etc.) configured to carry out a data aggregation process (e.g., a process for aggregating and/or analyzing data from sources such as a source API 302 and/or exception handler 310). For example, data aggregator 312 may include a data caching component, a data aggregator component, a data transformation component, a data mapping component, and/or a service router.

Intake sub-system 300 may also include a logging & tracing module 314, which may log and/or trace data associated with communications (e.g., communications from an API source 302). Logging & tracing module 314 may be part of a device having another purpose (e.g., data aggregator 312), or may be a separate device or component, such as a server or mobile device. In some embodiments, logging & tracing module 314 may include various components (e.g., modules, devices, processors, etc.) configured to carry out a data aggregation process (e.g., a process for tracing and/or logging data from sources such as a source API 302 and/or exception handler 310). For example, logging & tracing module 314 may include tracer 316 and/or trace analyzer 318.

Tracer 316 may perform functions to trace data, such as data associated with a communication from an API source 302, validator 308, etc. In some embodiments, tracer 316 may be configured to add trace identifiers and/or span identifiers to data associated with a communication. In some embodiments, tracer 316 may maintain definitions (e.g., user-defined, machine-defined, and/or a combination of user-defined and machine-defined) related to logging and tracing, such as definitions for where to transmit trace and/or log data, a threshold number of traces and/or logs to keep, data formats, particular combinations of identifiers to transmit, and/or particular libraries to trace. In some embodiments, tracer 316 may implement aspects of a function provider, such as Spring Cloud Sleuth.

Trace analyzer 318 may perform functions to analyze data, such as trace data and/or log data, which may be associated with communications from a device (e.g., a device implementing source API 302). For example, trace analyzer 318 may aggregate timing data (e.g., times when an exception occurred, exception frequency, etc.), a tag, rule failure data, rule satisfaction data, a device identifier, a message identifier, and/or any data associated with a source API 302. In some embodiments, trace analyzer 318 may generate visual representations of trace and/or log data (e.g., charts of filterable data, line diagrams, recommendations generated by statistical and/or machine learning algorithms, etc.). In some embodiments, trace analyzer 318 may implement aspects of a function provider, such as Zipkin.

Figure 3B:
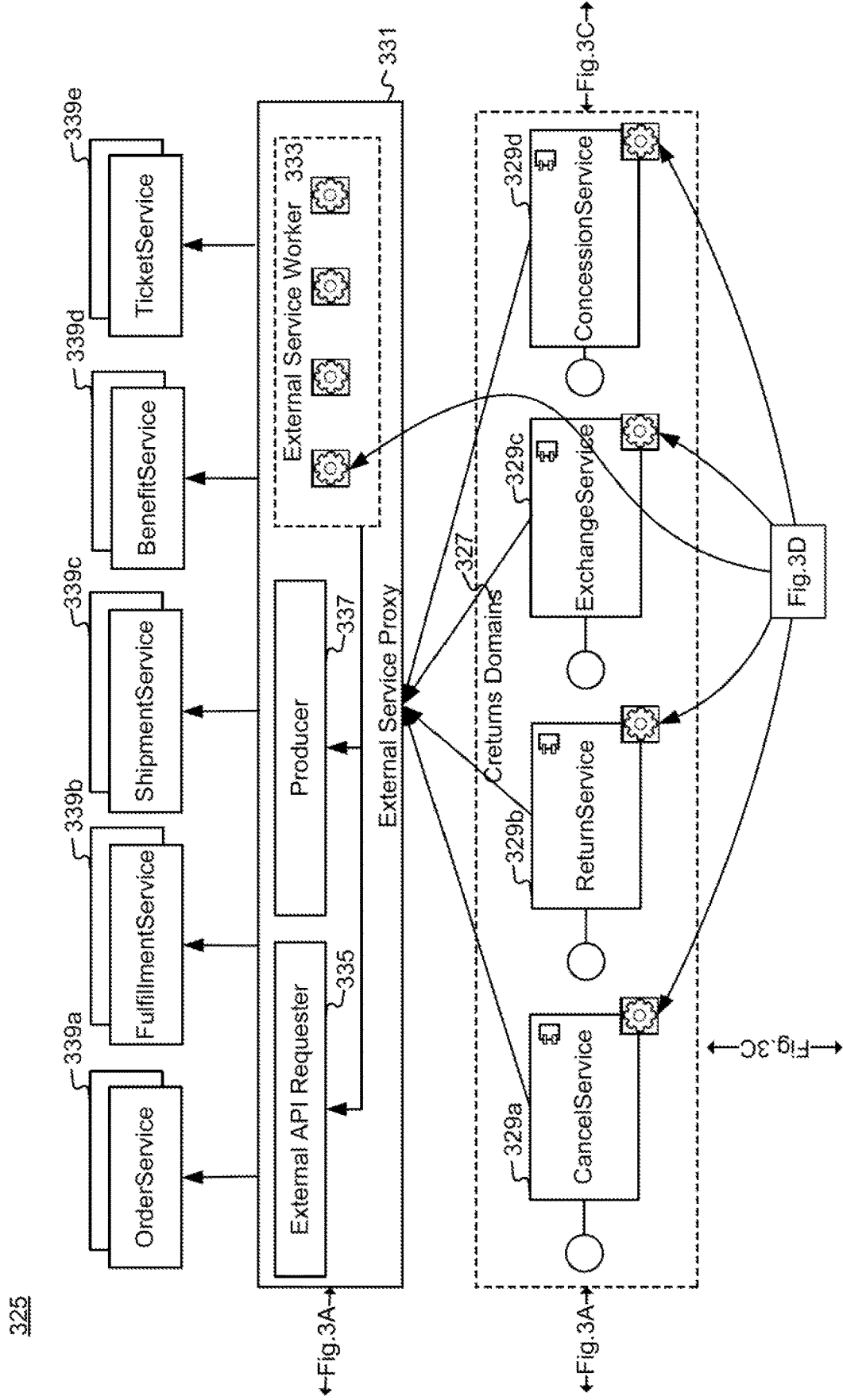
FIG. 3B illustrates an exemplary pictographic representation of an output sub-system 325.

FIG. 3B illustrates an exemplary pictographic representation of an output sub-system 325. Output sub-system 325 may be designated for processing output of the workflow sub-system 375 in FIG. 3D. Output sub-system 325 may pass processed output to external data sources 370 in FIG. 3C, pass processed output to be logged and/or traced with the logging & tracing module 314 in FIG. 3A and/or one or more of the external services 339a-e. Output sub-system 325 may be specifically configured for use by a consumer, a delivery-person, an administrator, and/or a seller. Output sub-system 325 may be implemented on a computing device having a processor, memory component, and/or communications component. In some embodiments, output sub-system 325 and/or components of output sub-system 325 may be communicably coupled to other sub-systems (e.g., as described in FIGS. 3A-3D).

Figure 3C:
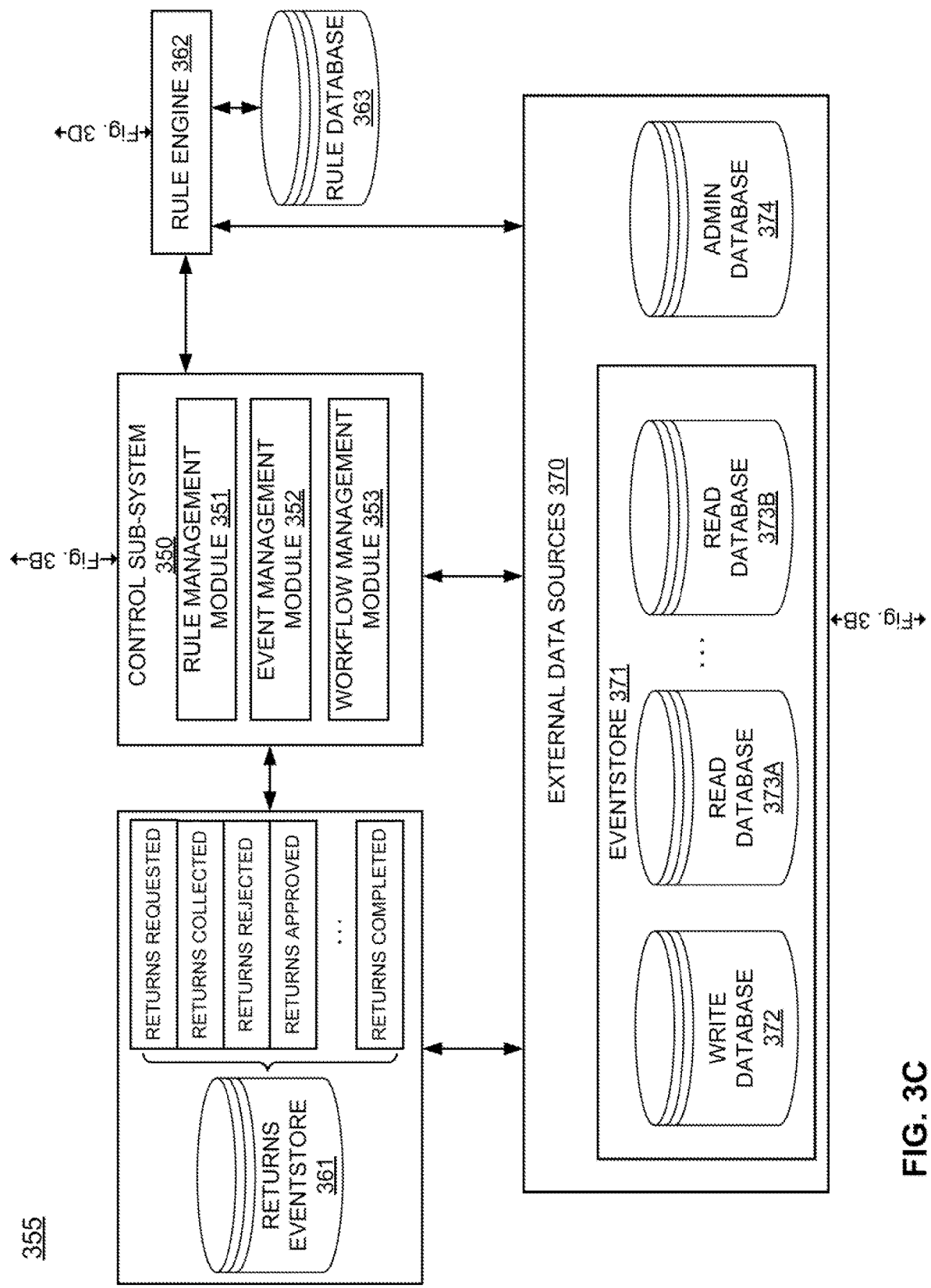
FIG. 3C illustrates a pictographic representation of an exemplary control sub-system, an exemplary returns event store, an exemplary rule engine, and exemplary external data sources, consistent with disclosed embodiments.
Figure 3D:
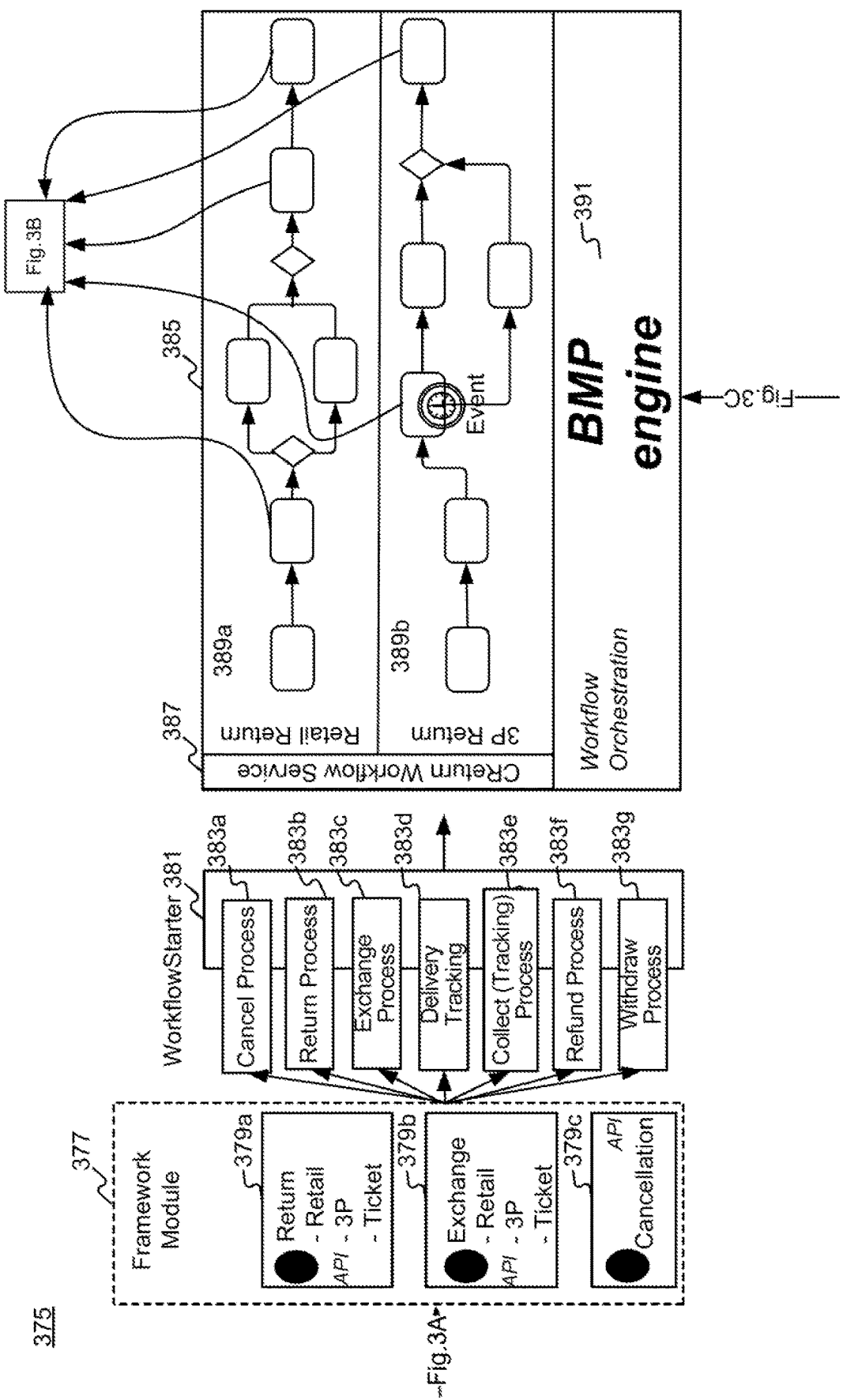
FIG. 3D illustrates an exemplary pictographic representation of a workflow sub-system 375.

Output sub-system 325 may include a number of Creturns Domains module 327, which may be communicably coupled to workflow sub-system 375 in FIG. 3D. In some embodiments, Creturns Domains module 327 may comprise a variety of services 329a-d. Examples of services as illustrated on FIG. 3B may include CancelService 329a, ReturnService 329b, ExchangeService 329c, and/or ConcessionsService 329d. Each of the services 329a-d may be responsible for processing output from the respective workflow tasks in workflow sub-system 375 in FIG. 3D. For example, cancel process workflow 383a in FIG. 3D may pass an output to CancelService 329a, while return process workflow 383b in FIG. 3D may pass an output to ReturnService 329b. Architecture of Creturns Domains module 327 be modified to add additional services as needed.

Creturns Domains module 327 may pass processed information to external data sources 370 in FIG. 3C, logging and tracing with logging & tracing module 314 in FIG. 3A and/or external service proxy module 331. Information passed to external data sources 370 is stored as described in section with reference to FIG. 3C. Information passed to logging & tracing module 314 is logged and processed as described earlier in section with reference to FIG. 3A.

External service proxy module 331, which is a part of output sub-system 325, may receive processed output from Creturns Domains module 327 for further direction to an appropriate external service 339a-339e. Output sub-system 325 may use external service proxy module 331 to connect repeatedly to the same service without the expenditure of time and computing resources required for initializing a service proxy more than once. External service proxy module 331 may be implemented as a software or a hardware system between Creturns Domains module 327 and external services 339a-339e. External service proxy module 331 may exist on the same machine as output sub-system 325 or on a separate server. External service proxy module 331 may be specifically configured for use by a consumer, an administrator, and/or a seller. External service proxy module 331 may be implemented on a computing device having a processor, memory component, and/or communications component.

External service proxy module 331 may also include an external service worker 333, which may receive data directly from the Creturn WorkflowStarter 381 in FIG. 3D and may be communicably coupled to workflow sub-system 375 in FIG. 3D. External service worker 333 may exist within an external service proxy module 331, or may exist as a separate component, such as a server, to which an external service proxy module 331 may be connected. External service worker 333 may include various components (e.g., modules, devices, processors, etc.) configured to carry out output processing. For example, external service worker 333 may process data that is not processed by the Creturns Domains module 327.

External service proxy module 331 may also include an external API requester 335, to which external service worker 333 may be communicably coupled. External API requester 335 may be part of external service proxy module 331, or may be a separate device or component, such as a server or a virtual instance. In some embodiments, external service proxy module 331 may have a direct communication to external API requester 335 based on which of the external services 339*a-e* is required to pass the output to, which may have been determined by Creturns Domains module 327 or external service worker 333. For example, if external service required an API for communication, external API requester 335 may request appropriate API information to establish a connection with the required external service. In some embodiments, external API requester 335 may be configured to re-format, split, parse, tag, and/or otherwise re-configure or transmit information from the communication based on at least one rule or algorithm used by the external service.

External service proxy module 331 may also include a Producer 337, to which external service worker 333 may be communicably coupled. Producer 337 may be part of external service proxy module 331, or may be a separate device or component, such as a server or a virtual instance. Producer 337 is used to publish messages to topics. Topics may be divided into a number of partitions, which contain messages. Each message in a partition is assigned and identified by its unique offset. The message itself contains information about what topic and partition to publish to so data can be published to different topics with the same producer. In some embodiments, Producer 337 may be implemented using Kafka.

External service proxy module 331 may pass processed information to logging & tracing module 314 in FIG. 3A and/or external services 339*a-e*. Information passed to logging & tracing module 314 is logged and processed as described earlier in in section with reference to FIG. 3A. External services 339*a-e* initiate actions based on the requests. Examples of services as illustrated on FIG. 3B may include OrderService 339*a*, FulfillmentService 339*b*, ShipmentService 329*c*, BenefitService 339*d* and/or TicketService 339*e*. Each of the services 329*a-d* may be responsible for initiation of specific actions. For example, in the event, workflow sub-system 375 in FIG. 3D passes an output for ExchangeService 329*c* processing, it may initiate a number of external services. Exchange of an item may involve an output to OrderService 339*a* to order (order instruction may include instruction to buy an item from a supplier, inform a picker to prepare the item, purchase the item online, go to a 3$^{rd}$ party store and pick it up, or other instructions directed to acquiring an item) a new item, output to ShipmentService 339*c* to generate a return shipping label, and/or an output to FulfillmentService 339*b* to process returned item. Architecture of output sub-system 325 may be modified to add additional external services as needed.

FIG. 3C illustrates a pictographic representation 355 of an exemplary control sub-system 350, an exemplary returns eventstore 361, an exemplary rule engine 362, and exemplary external data sources 370, consistent with disclosed embodiments.

Control sub-system 350 may be configured to create, update, maintain, and/or manage data used by various components of system 300 in FIG. 3A, 325 in FIG. 3B, and 375 in FIG. 3D. For example, control sub-system 350 may be configured to create, update, and/or modify parameters for managing returns by customers (e.g., rules for approving and rejecting a return by a customer), managing workflows for processing returns, and/or storing specific return events.

As illustrated in FIG. 3C, control sub-system 350 may include a rule management module 351, an event management module 352, and a workflow Management module 353.

Rule management module 351 may be configured to manage rules for processing returns by customers. For example, rule management module 351 may be configured to create and/or modify a rule for declining a return request by a customer. By way of example, rule management module 351 may be configured to create and/or modify a rule for declining a return request by a customer based on various parameters, including, for example, the data relating to the customer's previous return(s), the monetary amount involved in the return request, the type of the goods to be returned, etc. For example, rule management module 351 may create a rule for declining a return request by a customer if the customer returned an empty (or partially empty) box fora return within a predetermined number of days in the past (e.g., 180 days), which may indicate the customer may have attempted to defraud the system.

In some embodiments, rule management module 351 may be configured to create and/or modify a rule based on input by the user of control sub-system 350. For example, rule management module 351 may receive input from the user for modifying one or more parameters of a rule for validating return requests and modifying the parameter(s) of the rule accordingly.

Event management module 352 may be configured to create, modify, and/or manage events stored in returns eventstore 361. For example, event management module 352 may create a series of events for a return request initiated by a customer or the system and store the events into returns eventstore 361. By way of example, a customer may initiate a return of an order via a user device associated with the customer. Event management module 352 may create an event of receiving the return request and store the event in returns eventstore 361. In some embodiments, an event may include information relating to the return, the customer, and the order associated with the return. For example, event management module 352 may create a first event for a return requested by a customer, which may include the information of the return request, the time stamp of receiving the return request, the information relating to the customer, or the like, or a combination thereof. Event management module 352 may create a second event when one or more items subject to the return are received from the customer, which may include the information relating to the item(s) received (e.g., the quantity, condition, etc.), the time stamp of receiving the item(s), etc. Event management module 352 may also store the first and second event as a series of events relating to the return in returns eventstore 361.

In some embodiments, returns eventstore 361 may include, for example, Oracle™ databases, Sybase™ databases, or other relational databases or non-relational databases, such as Hadoop™ sequence files, HBase™, or Cassandra™ Returns eventstore 361 may include NoSQL databases such as HBase, MongoDB™ or Cassandra™. Alternatively, database 320 may include relational databases such as Oracle, MySQL and Microsoft SQL Server. In some embodiments, returns eventstore 361 may take the form of servers, general purpose computers, mainframe computers, or any combination of these components.

Workflow management module 353 may be configured to create, modify, and/or manage workflows used by various components of system 300 in FIG. 3A, 325 in FIG. 3B, and 375 in FIG. 3D. For example, workflow management module 353 may be configured to create, modify, and/or manage cancel process 383a, return process 383b, exchange process 383c, delivery tracking 383d, collect process 383e, refund process 383f, and withdraw process 383g used by workflow sub-system 375 (illustrated in FIG. 3D).

In some embodiments, control sub-system 350 may be configured to create, modify, and/or manage services used by Creturns Domains module 327 (illustrated in FIG. 3B). For example, control sub-system 350 may be configured to create, modify, and/or manage CancelService 329a, ReturnService 329b, ExchangeService 329c, and/or ConcessionsService 329d. Creturns Domains module 327 may obtain one or more services from control sub-system 350.

Rule engine 362 may be configured to obtain rules for processing returns from control sub-system 350, and store and/or manage the rules for other components of the workflow sub-system 375 in FIG. 3D. For example, the workflow sub-system 375 in FIG. 3D may be configured to obtain the rules for validating return requests from rule engine 362. In some embodiments, rule engine 362 may include a rule database 363 for storing the rules for managing and/or processing returns.

External data sources 370 may be configured to store data for various components of system including subsystems 300 in FIG. 3A, 325 in FIG. 3B, and 375 in FIG. 3D. For example, external data sources 370 may store various services created and/or updated by control sub-system 350, including, for example, CancelService 329a, ReturnService 329b, ExchangeService 329c, and/or ConcessionsService 329d. Creturns Domains module 327 may obtain one or more services from external data sources 370.

As another example, external data sources 370 may include an eventstore 371 configured to store data relating to events (e.g., return events). In some embodiments, eventstore 371 may include a write database 372 configured to write data in response to write commands. Eventstore may also include one or more read databases 373 (e.g., read database 373A, read database 373B, etc.) configured to read data only in response to query commands. In some embodiments, a read database 373 may include data that are the same as the data included in write database 372. For example, if the data stored in write database 372 are updated in response to a write command, the corresponding data in read database 373 may be updated accordingly such that write database 373 and read database 373 may include the same data. In some embodiments, external data sources 370 may include an admin database 374 configured to store administration data for control sub-system 350.

In some embodiments, eventstore 371 and/or admin database 374 may include, for example, Oracle™ databases, Sybase™ databases, or other relational databases or non-relational databases, such as Hadoop™ sequence files, HBase™, or Cassandra™ Eventstore 371 and/or admin database 374 may include NoSQL databases such as HBase, MongoDB™ or Cassandra™. Alternatively, database 320 may include relational databases such as Oracle, MySQL and Microsoft SQL Server. In some embodiments, eventstore 371 and/or admin database 374 may take the form of servers, general purpose computers, mainframe computers, or any combination of these components.

FIG. 3D illustrates an exemplary pictographic representation of a workflow sub-system 375. Workflow sub-system 375 may be designated for processing output of the intake sub-system 300. Workflow sub-system 375 may pass Validator 308 output to output sub-system 325. Workflow sub-system 375 may be specifically configured for use by a consumer, a delivery-person, an administrator, and/or a seller. Workflow sub-system 375 may be implemented on a computing device having a processor, memory component, and/or communications component. In some embodiments, workflow sub-system 375 and/or components of workflow sub-system 375 may be communicably coupled to other sub-systems (e.g., as described in FIGS. 3A-3D).

Workflow sub-system 375 may include a framework module 377. Framework module 377 may utilize Spring WebFlux or similar technology. Framework module 377 may provide for a non-blocking web stack to handle concurrency with a small number of threads and scale with fewer hardware resources. Framework module 377 may include a variety of programming modules. Examples of modules as illustrated in FIG. 3D may include return module 379a, exchange module 379b, and cancellation module 379c. Modules 379a-c may contain processing logic for retail, third party, and ticket offers. Modules 379a-c may also include an API for communication with sub-systems responsible for respective data.

Workflow sub-system 375 may also include a WorkflowStarter 381, which may be communicatively coupled to framework module 377. WorkflowStarter 381 may include a list of processes 383a-g, which may initiate workflows based on the input received from the framework module 377. Examples of processes as illustrated in FIG. 3D may include cancel process 383a (containing instructions for starting a workflow initiated by the cancelation of an order by the consumer, supplier, or other order handler), return process 383b (containing instructions for starting a workflow initiated by the complete or partial order return by the consumer, supplier, or other order handler), exchange process 383c (containing instructions for starting a workflow initiated by an exchange of complete or partial order started by the consumer, supplier, or other order handler), delivery tracking 383d (containing instructions for starting a workflow initiated by the request to track delivery status of a complete or partial order by the consumer, supplier, or other order handler), collect process 383e (containing instructions for starting a workflow initiated by the request for tracking information of a complete or partial order by the consumer, supplier, or other order handler), refund process 383f (containing instructions for starting a workflow initiated by a request for refund for a complete or partial order started by the consumer, supplier, or other order handler), and withdraw process 383g (containing instructions for starting a workflow initiated by a withdrawal of complete or partial order started by the consumer, supplier, or other order handler).

Furthermore, each of the programing modules 379*a-c* of framework module 377 may initiate a plurality of processes 383*a-g*. For example, cancelation module 379*c* may initiate delivery tracking process 383*d* to determine if the item that is being canceled was deliver or is still in possession of the delivery personnel. Same cancelation module 379*c* may also initiate refund process 383*f* for issuing a refund to the customer.

Various combinations may be programed and may be specifically configured for use by a consumer, a delivery-person, an administrator, and/or a seller. WorkflowStarter 381 may be implemented on a computing device having a processor, memory component, and/or communications component. In some embodiments, WorkflowStarter 381 and/or components of WorkflowStarter 381 may be communicably coupled to other parts of workflow sub-system 375 (e.g., as described in FIG. 3D). Furthermore, architecture of workflow sub-system 375 be modified to add additional processes and programing modules as needed.

Workflow sub-system 375 may also include a workflow service module 385, which may be communicably coupled to WorkflowStarter 381 and output sub-system 325. Workflow service module 385 may be designated for workflow control and design. Workflow service module 385 may include a Creturn workflow service module 387 and a workflow orchestration module 391. Workflow service module 385 may provide output for processing by output sub-system 325.

Creturn workflow service module 387 may include a number of sub-modules 389*a-b* which may control workflows based on the input received from the WorkflowStarter 381. Examples of processes as illustrated in FIG. 3D may include retail return sub-module 389*a*, which allows for design and/or control of the workflows for the return of retail items and third party return sub-module 389*b*, which allows for design and/or control of the workflows for the return of third party items. Architecture of Creturn workflow service module 387 be modified to add additional sub-modules as needed. Workflows within Creturn workflow service module 387 may be controlled, and/or designed by a consumer, a delivery-person, an administrator, and/or a seller. Creturn workflow service module 387 may be implemented on a computing device having a processor, memory component, and/or communications component and may be communicably coupled to other parts of workflow sub-system 375.

Workflow orchestration module 391 may include a set of workflow controls which may be accessed by a consumer, a delivery-person, an administrator, and/or a seller. Workflow orchestration module 391 may be implemented with a business process management (BPM) engine and supporting frameworks, one example of which may be Activiti with Spring Boot/Docker. A workflow orchestration module 391 engine has as core goal to take a process definition comprised of human tasks and service calls and execute those in a certain order, while exposing various API's to start, manage and query data about process instances for that definition. Workflow orchestration module 391 may be implemented on a computing device having a processor, memory component, and/or communications component. Workflow orchestration module 391 may be communicably coupled to other parts of workflow sub-system 375.

Figure 4:
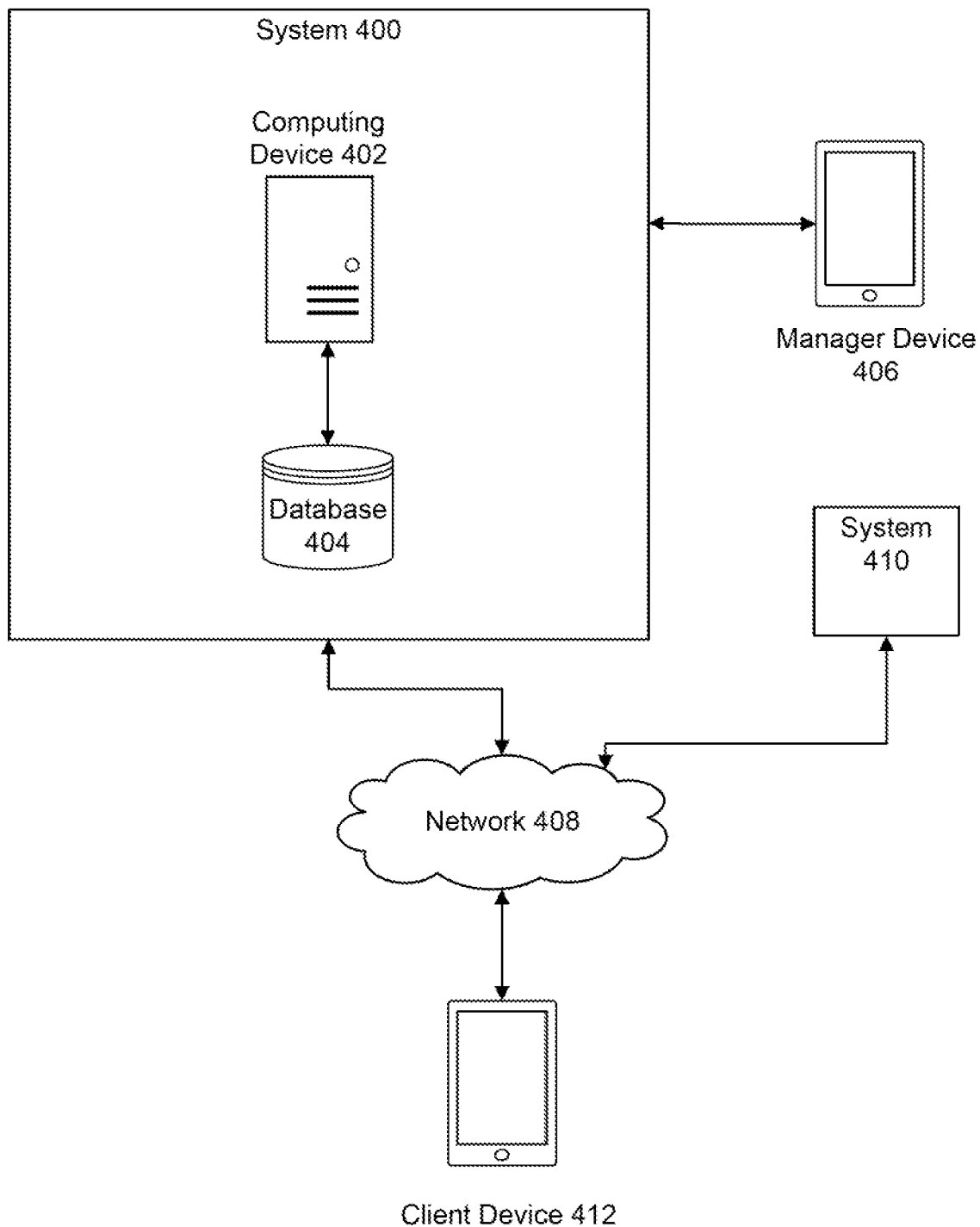
FIG. 4 illustrates an exemplary pictographic representation of a network architecture 40.

FIG. 4 illustrates an exemplary pictographic representation of a network architecture 40, consistent with disclosed embodiments. In some embodiments, network architecture 40 may include any of the systems, devices, modules, or other elements described with respect to FIGS. 1-3D. Network architecture 40 may also include a system 400, which may include at least one computing device 402. A computing device may be a server, a special purpose server, a virtual server, a controller, an adapter, or other device capable of electronic communication and/or computation. In some embodiments, computing device 402 may be associated with implementing a particular process, service (e.g., a messaging service implemented using Kafka), application, and/or workflow. In some embodiments, computing device 402 may be connected to at least one database 404, which may store data associated with operations performed by computing device 402. Database 404 may be a relational database (e.g., implementing mySQL or Cassandra), a centralized database, a distributed database, a commercial database, a cloud database, an object-oriented database, and/or a cloud database. In some embodiments, a single database 404 may be communicably connected to multiple computing devices 402. In some embodiments, computing device 402 may be an instance of computing device 500 (described below).

Network architecture 40 may also include a manager device 406, which may be communicably connected to system 400. In some embodiments, manager device 406 may be configured to send configuration information to system 400. By way of example, manager device 406 may send instructions to configure or re-configure a computer model maintained at a computing device 402. In some embodiments, manager device 406 may be able to perform certain operations (e.g., sending reconfiguration information) only after having been authenticated. Authentication may be based on user login information input at manager device 406, a universal serial bus (USB) security key inserted at manager device 406, an IP address of manager device 406, a MAC address of manager device 406, a unique identifier of manager device 406, a two-factor authentication key received from manager device 406 or another device, and/or any information identifying manager device 406 or a user or manager device 406. In some embodiments, manager device 406 may be an instance of computing device 500 (described below).

Network architecture 40 may also include network 408, which may be a public network or private network and may include, for example, a wired or wireless network, including, without limitation, a Local Area Network (LAN), a Wide Area Network (WAN), a Metropolitan Area Network, an IEEE 802.11 wireless network (e.g., "Wi-Fi"), a network of networks (e.g., the Internet), a land-line telephone network, or the like. Network 408 may be connected to other networks (not depicted in FIG. 4) to connect the various system components to each other and/or to external systems or devices. In some embodiments, network 408 may be a secure network and require a password to access the network.

In some embodiments, network architecture 40 may include a system 410, which may include a computing device (e.g., a computing device 500) for performing operations separately from system 400. For example, system 410 may support a service (e.g., analyzing log files) that system 400 may not implement locally. In some embodiments, system 410 may be associated with a supplier of products to a fulfillment center manager, who may be associated with system 400.

Network architecture 40 may also include a client device 412, which may transmit and/or receive data related to a client request. Client device 412 may include a personal computer, a laptop, a tablet, a cellphone, a smartphone, a smartwatch, or any device used by a customer. In some embodiments, client device 412 may transmit data to system 400 containing information associated with a client request.

Client device 412 may also receive information from system 400 related to a client request (e.g., an identified error of the client request). In some embodiments, client device 412 may be an instance of computing device 500 (described below).

Figure 5:
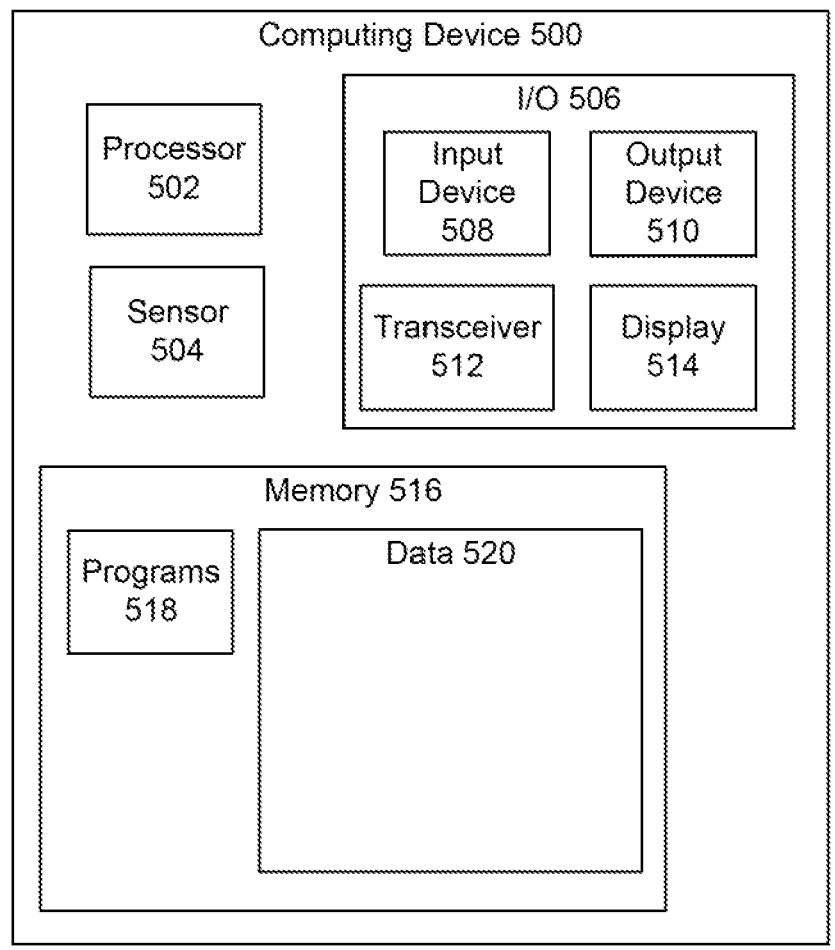
FIG. 5 illustrates an exemplary pictographic representation of a computing device 500.

FIG. 5 illustrates an exemplary pictographic representation of a computing device 500, consistent with disclosed embodiments. Computing device 500 may include a processor 502, which may include one or more dedicated processing units, application-specific integrated circuits (ASICs), field-programmable gate arrays (FPGAs), graphical processing units, or various other types of processors or processing units coupled with memory 516. Processor 502 may constitute a single-core or multiple core processor that executes parallel processes simultaneously. For example, processor 502 may be a single-core processor configured with virtual processing technologies. In some embodiments, processor 502 may use logical processors to simultaneously execute and control multiple processes. Processor 502 may implement virtual machine technologies, or other known technologies to provide the ability to execute, control, run, manipulate, store, etc., multiple software processes, applications, programs, etc. In another embodiment, processor 502 may include a multiple-core processor arrangement (e.g., dual core, quad core, etc.) configured to provide parallel processing functionalities to allow execution of multiple processes simultaneously. One of ordinary skill in the art would understand that other types of processor arrangements could be implemented that provide for the capabilities disclosed herein. The disclosed embodiments are not limited to any type of processor. Processor 502 may execute various instructions stored in memory 516 to perform various functions of the disclosed embodiments described in greater detail below. Processor 502 may be configured to execute functions written in one or more known programming languages.

In some embodiments, computing device 500 may include a sensor 504, such as an accelerometer, a light sensor, an audio sensor, an infrared sensor, a motion sensor, a piezoelectric sensor, a laser sensor, a sonar sensor, a GPS sensors, an electromagnetic sensor, and the like. Sensor 504 may detect aspects of computing device 500 (e.g., a GPS sensor may detect a position of computing device 500), which may be used to determine communications to transmit to or receive from computing device 500. By way of example, system 400 may transmit a notification (e.g., related to a client request) to client device 412 based on a sensor determining that a client device 412 is in motion.

Computing device 500 may also include input/output device (I/O) 506, which may include at least one of a display (e.g., graphical display, textual display, display 514, etc.), an LED, a router, a touchscreen, a keyboard, a microphone, a speaker, a haptic device, a camera, a button, a dial, a switch, a knob, a touch pad, a button, a microphone, a location sensor, an accelerometer, a camera, a fingerprint scanner, a retinal scanner, a biometric input device, an ultrasonic scanner, a transceiver 512, an input device 508, an output device 510, or other I/O device to perform methods of the disclosed embodiments. I/O 506 may include components of an interface (e.g., a user interface). I/O 506 may also include a network interface (not shown), which may include at least one of a wired or wireless network card/chip set.

Computing device 500 may also include memory 516, which may be a single memory component, or multiple memory components. Such memory components may include an electronic storage device, a magnetic storage device, an optical storage device, an electromagnetic storage device, a semiconductor storage device, or any suitable combination of the foregoing. For example, memory 516 may include any number of hard disks, random access memories (RAMs), read-only memories (ROMs), erasable programmable read-only memories (EPROMs or Flash memories), and the like. Memory 516 may include one or more storage devices configured to store instructions usable by processor 502 to perform functions related to the disclosed embodiments. Memory 516 may also include any number of programs 518, applications, application program interfaces (APIs), services, processes, modules, code, scripts, functions, or any other data, consistent with the disclosed embodiments. Programs 518 may be written in one or more programming or scripting languages. Memory 516 may also maintain data 520, which may include data associated with a user account, an application, a particular device, a model, a communication, or any other data related to handling client requests. Data may be exchanged between computing devices 500 (e.g., multiple computing devices 402, a computing device 402 and a client device 412, etc.) in accordance with any number of formats or protocols, including XML, REST, SOAP, JSON, GraphQL, and the like.

Memory 516 may also include a model (not shown), which may be an artificial intelligence (AI) model for handling client requests, consistent with disclosed embodiments. A model may be, without limitation, any one of a computer software module, an algorithm, a machine-learning model, a data model, a statistical model, a recurrent neural network (RNN) model, a long-short term memory (LSTM) model, or another neural network model, consistent with disclosed embodiments. In some embodiments, a model may be a model in a learning stage or may have been trained to a degree (e.g., by a developer, a machine, or a combination of both). In some embodiments, a developer may interact with a model to approve or disapprove of suggested changes to a model or parameters of a model (e.g., suggested by a machine). After this interaction, the model may be updated to reflect the user interactions and/or machine inputs. In some embodiments, a model may be configured to automatically add, configure, and/or remove parameters without human intervention.

Figure 6:
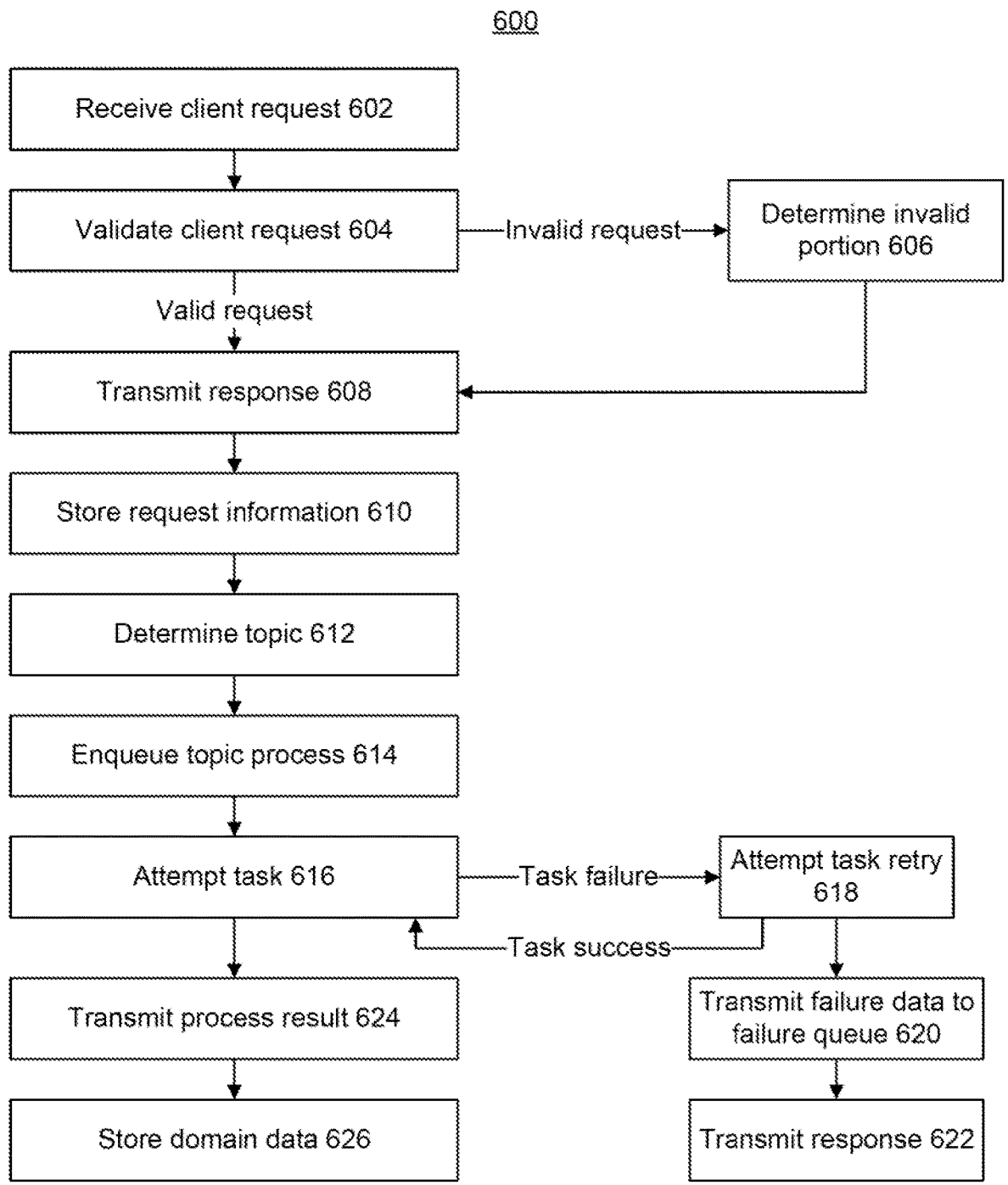
FIG. 6 depicts a flowchart of an exemplary process for handling client requests, consistent with disclosed embodiments.

FIG. 6 depicts a flowchart of an exemplary process 600 for handling client requests, which may be performed by a processor in accordance with disclosed embodiments. For example, process 600 may be performed entirely or in part by computing device 402 (e.g., using processor 502). Alternatively or additionally, some steps of process 600 may be performed by client device 412 and other steps may be performed by another device, such as a computing device of system 410. While process 600 is described with respect to computing device 402, one of skill will understand that the steps illustrated in FIG. 6 are exemplary and steps may be added, merged, divided, duplicated, repeated, modified, and/or deleted in some embodiments.

At step 602, computing device 402 may receive a client request. For example, client device 412 may transmit a client request, which may be received at a computing device 402. A client request may include request data, which may be related to an item ordered by the client device 412. For example, a client request may include a request to return an item, a request to cancel an item order, a request to exchange an ordered item, a request for a refund, a request for an order modification, a request for an order delay, a request for an order expedition, and/or a request for a concession. Request data may include an item identifier, a customer identifier, a client device identifier (e.g., an IP address), an order payment amount, an item price, a discount amount, a promotion identifier, a shipping payment amount, a shipping service, an item service (e.g., gift-wrapping), an address, a telephone number, an email address, a request reason, an order placement time, an estimated order processing time, an estimated order shipping date, an estimate order delivery date, and/or other data for handling a client request, consistent with disclosed embodiments. In some embodiments, request data may comprise a combination of structured and unstructured data.

At step 604, computing device 402 (e.g., an endpoint computing device within system 400) may validate a client request (e.g., a client request received from a remote client device). In some embodiments, validating the client request may comprise extracting request data from the client request. In some embodiments, request data may be analyzed using a rule engine. For example, computing device may validate a client request by using a rule engine to parse and validate individual portions of the client request. For example, a rule engine may analyze portions of a client request to confirm that they adhere to a proper format and/or contain at least one stipulated criterion (e.g., an order number, an item identifier, a user identifier, or any particular combination of request data). In some embodiments, validating a client request may comprise separating structured and unstructured request data prior to using a rule engine. In some embodiments, a rule engine may apply an inference method, hierarchical rule structure, or other technique to validate a client request. In some embodiments, a rule engine may implement rules for detecting an indicator of fraud included in the request data. For example, a particular combination of data and/or lack of data may trigger a device to tag the client request as potentially fraudulent. For example, the request data may include new data (e.g., a new client device identifier) and/or may lack particular data (e.g., an order number). In some embodiments, computing device 402 may determine whether the client request was generated by a client device 412 while the client device was logged into a particular application.

In some embodiments, a computing device 402 (e.g., validator 308) may determine that a client request is invalid and proceed to step 606. At step 606, computing device 402 may determine at least one invalid portion of a client request, which may be based on request data. For example, a client request may include an invalid order identifier, an invalid item identifier, an invalid client device identifier, an invalid order date, etc. In some embodiments, an invalid portion may be determined according to a rule engine. In some embodiments, computing device 402 may determine that a client request is invalid by comparing request data to stored order data stored (e.g., data generated by a scanning device when a worker scans an item, data generated by a system 410, data generated when an order is placed by a client device, etc.). For example, a client request may be determined invalid if it contains an order identifier and/or order identifier that is not associated with an order made by client device 412, a client account associated with client device 412, and/or a user associated with a particular client account.

At step 608, computing device 402 may transmit a response, which may be transmitted to a remote client device 412. A response may be formatted and/or transmitted based on validation performed at step 604. In some embodiments, computing device 402 may transmit a response after determining that a client request is valid. In some embodiments, computing device 402 may transmit a response after determining at least one invalid portion of the client request. In some embodiments, the response may include a notification, which may be based on analyzing the client request using the rule engine, and which may comprise an indication of success or failure of the validating. In some embodiments, the response may contain an indication of a request status. For example, the response may indicate that an entirety of a client request was valid or may indicate that at least a portion of a client request was invalid. To further this example, the response may indicate a particular portion of a client request that was invalid (e.g., a missing two-factor authentication response, an invalid item identifier, an invalid order number, etc.). In some embodiments, the response may indicate that the client request is in a queue.

At step 610, computing device 402 may store request information (e.g., from the request data). For example, computing device 402 may store request information in a database 404 (such as an eventstore 361 in FIG. 3C). In some embodiments, prior to storing request information, computing device 402 may reformat the data to a format suitable for a particular application, model, etc. In some embodiments, reformatting data may include converting unstructured data into structured data.

At step 612, computing device 402 may determine a topic, which may have an associated process (e.g., delivery tracking process 383*d*), service, and/or workflow. In some embodiments, computing device 402 may determine a topic based on a portion of request data. For example, request data may include a request type identifier (e.g., return request, exchange request, etc.), which may have an associated API and/or process. In some embodiments, computing device 402 may determine a topic process associated with the topic. In some embodiments, computing device 402 may determine a queue (e.g., an asynchronous queue) for a client request and/or request data. In some embodiments, determining a topic and/or topic queue may include parsing a header of a client request to determine a client request topic, comparing a client request topic to a sequence of queue topics (e.g., reflected within framework module 377 and/or WorkflowStarter 381 in FIG. 3D), and/or determining that the client request topic matches a topic (e.g., the determined topic) in a sequence of queue topics.

At step 614, computing device 402 may enqueue a topic process, which may have been determined at step 612. In some embodiments, enqueueing a topic process may include enqueuing (e.g., asynchronously) a client request in a queue, which may be configured to analyze the client request according to a model. In some embodiments, analyzing a client request may comprise any or all of steps 614-624. In some embodiments, enqueueing a topic process may comprise determining at least one service to which to route information associated with a client request (e.g., a service of Creturn workflow service module 387 in FIG. 3D). In some embodiments, a combination of topic processes and/or services may operate asynchronously, such that user experience at a client device 412 is not impacted (e.g., topic processes are implemented while a client device 412 maintains access to functionality of an associated API (e.g., an API for initiating client requests). For example, client device 402 may transmit additional request data following the initial submission of a client request. Such subsequent data may be used by a computing device 402 to enqueue a different topic process, alter a workflow, modify a model, and/or make a change to a sequence of processes and/or services for handling the client request.

At step 616, computing device 402 may attempt a task, which may occur at a first time, and which may be part of a topic process determined at step 614. A task may include a process, operation, call (e.g., API call), computation, data transmission, and/or any computerized instruction for handling a client request. In some embodiments, a task may be part of a workflow (e.g., a workflow implemented by module 389*a*), which may include a plurality of tasks. In some embodiments, a task may include querying an inventory device or system using an item identifier (e.g., an item identifier received as part of a client request) or other data, receiving a response from the inventory device or system, determining a corrective action based on an inventory system response. By way of example, a computing device 402 may transmit an item identifier received in a client request for an item return and an inventory system may determine that the item identifier has a character differing from an item in a purchase history associated with the client device (e.g., an erroneous item identifier having an incorrect letter and/or number), and may change the character automatically and/or prompt a client device 412 for additional information (e.g., confirmation of the item identifier). Other corrective actions may include transmitting a notification of a refund amount, altering a vehicle itinerary at a remote device, altering restocking instructions at a remote device (e.g., a device associated with a working in a fulfillment center), transmitting instructions to issue a refund to a remote device, etc. A corrective action may be initiated automatically and/or in response to a user input at a device (e.g., manager device 406). In some embodiments, corrective action may be used, possibly together with other information, to modify a model, consistent with disclosed embodiments.

In some embodiments, system 400 may maintain a plurality of workflows, which may be configured, removed, scaled, etc., independently of one another. For example, a workflow related to a return process may be altered or scaled (e.g., based on an application of a model), while a workflow related to an exchange process may be maintained as unchanged. In some embodiments, a number of computing resources (e.g., a number of computing devices 402, such as a number of virtual servers, an amount of bandwidth, an amount of processing resources, an amount of a network resource, an amount of dedicated queue space, etc.) for attempting a task or plurality of tasks may be scaled according to the resource load of the task or tasks. For example, a device (e.g., manager device 406) may determine a resource usage of a computing device 402 and may scale an amount of a resource for handling a client request based on the determined resource usage. In some embodiments, scaling an amount of a resource may comprise initializing a virtual computing resource (e.g., a virtual server, container, virtual machine, hypervisor, etc.).

In some embodiments, a computing device 402 may determine a first failure of attempting a task, and may proceed to step 618, where it may perform a responsive action, such as attempting to retry the failed task at a second time. In some embodiments, computing device 402 may attempt to retry the task according to a designated number of re-attempts for a task before proceeding to another step (e.g., step 620). In some embodiments, the predetermined number of times for retrying a task may be associated with a type of task, a type of topic, an age of a client request, or any other data associated with a client request. If a retry of a task is successful, computing device 402 may return to step 616 and attempt another task, or my process to step 624. If a retry of a task is unsuccessful, or alternatively, if the initial attempt of the task failed and no retries were attempted, computing device 402 may proceed to step 620. For example, based on a second failure (or a third failure, fourth failure, etc.), computing device may proceed to step 620.

At step 620, computing device 402 may transmit failure data, which may be determined by computing device 402, to a failure queue, which may be maintained at another device. For example, failure data may be transmitted to a failure information device (e.g., a manager device 406). In some embodiments, failure data may be transmitted to a client device 412 (e.g., to notify the client device of the failure, and possibly to identify a source of the failure, as discussed below). Transmitting failure data may be performed as a responsive action in response to a detected failure (e.g., detected based on a failure of an attempted task). Failure data may include an identifier of a failed task, a service associated with a failed task, a workflow associated with a failed task, a process associated with a failed task, and/or request data associated with a failed task. By identifying particulars such as these in the failure data, a user associated with a device (e.g., user device 412, manager device 406, etc.) may receive a clearer impression of the cause of a failure. Moreover, these particulars may also correspond to particular parameters in a model, which may allow a model to improve through autonomous and/or semi-autonomous training. In some embodiments, computing device 402 may perform a responsive action of determining error information. For example, a particular error and/or error type may be identified as precipitating the failure, such as a misfunctioning database, a network issue (e.g., low bandwidth, high latency, loss of connection, etc.), a logic error (e.g., a bug within a workflow, program, service, etc.), a rejected API call, a misformatted API call. In some embodiments, computing device 402 may determine a failure based on information received from another device and/or system. By way of example, computing device 402 may receive information from a device associated with stock-keeping data and/or item shipment data, and may determine based on the received information that an item a customer has requested as a replacement for a received item is not in stock, discontinued, backordered, etc., and may therefore determine that a particular task associated with the replacement item has failed. In some embodiments, a model may be applied to failure data to determine a cause of the failure and/or a responsive action. This model may be separate from a model configured for handling client requests. In some embodiments, failure data may be combined with an input from a manager device 406, which may be used by a model for training and/or modifying an aspect for handling client requests (e.g., modifying a service, a program, queue, etc.). In some embodiments, computing device 402 may perform a responsive action of modifying at least one model parameter associated with failure data, adding the failure data to a training dataset, sending a notification to a manager device, prompting a client device for additional data, and/or taking any other action to train a model based on the request data and/or failure data.

At step 622, computing device 402 may perform a responsive action of transmitting a response, which may be transmitted to a manager device 406, client device 412, or other device within network architecture 40. A response may include the failure data or other information related to the failed task (e.g., discussed with respect to step 620). In some embodiments, a response may include a prompt for additional information from a device (e.g., an alternative replacement item to be selected at client device 412 based on an item identified in an initial client request being of low stock, backordered, out-of-stock, recalled, etc.).

At step 624, computing device 402 may transmit a process result, which may be transmitted to a client device 412. A process result may include an indication that a topic process has been successfully completed (e.g., indicating that a return process has completed successfully) and/or that a topic process has successfully reached an intermediate stage (e.g., a returned item has been received but a refund has not yet been issued). In some embodiments, a computing device 402 may transmit a failure response (e.g., a response indicating that a task, queue, or other action associated with a client request failed) to a remote client device 412.

At step 626, computing device 402 may store domain data. Domain data may include cancelation request data, return request data, exchange request data, a return ID, an item identifier, a date of an initial request, error data, task data, or any other data related to a client request. Domain data may be stored in a relational database such that associations between similar requests and/or request results may be determined. In some embodiments, domain data may differ from request data in that it may include data that was not included in the initial client request, which may have been subsequently generated (e.g., a customer may have altered request data at client device 412, an estimated time of a refund may have changed, an estimated date of replacement item delivery may have changed, a customer may have responded to new information regarding a return, exchange, cancelation, etc.). In some embodiments, a database may store domain data related to multiple client requests, which may be associated with the same client device or different client devices. In some embodiments, a model may be applied to domain data to determine modifications for a process, service, workflow, module, device configuration, or other system configuration for handling client requests.

In some embodiments, computing device 402 may determine a performance indicator of a model, which may be based on analyzing a client request (e.g., according to any of the steps described above). A performance indicator may include events related to a client request, including without limitation: a number of errors encountered, a type of error encountered, a sequence of events, a level of computation resources used to handle a client request, a client device identifier, a response time associated with a task and/or client request, and/or an item identifier. In some embodiments, a performance indicator may be expressed relative to a performance threshold (e.g., only one error was detected, but was rectified through additional data from a client device, thus not reaching a performance threshold indicating a need for model training). Computing device 402 may also determine a modification to a model based on the performance indicator. In some embodiments, computing device 402 may determine a modification to a model based on domain data from multiple client requests (e.g., a first and second client request) and/or performance indicators related to multiple client requests.

In some embodiments, computing device 402 may transmit a notification of a determined modification of a model to a manager device 406. The manager device may subsequently accept the modification, alter the modification, suspend the modification, suspend the model, reject the modification, and/or generate a modification request for a model, which may be transmitted to computing device 402 or another device within network architecture 40. A device receiving a modification request may modify the model based on the modification request (e.g., modify a parameter of the model identified in the modification request).

Figure 7:
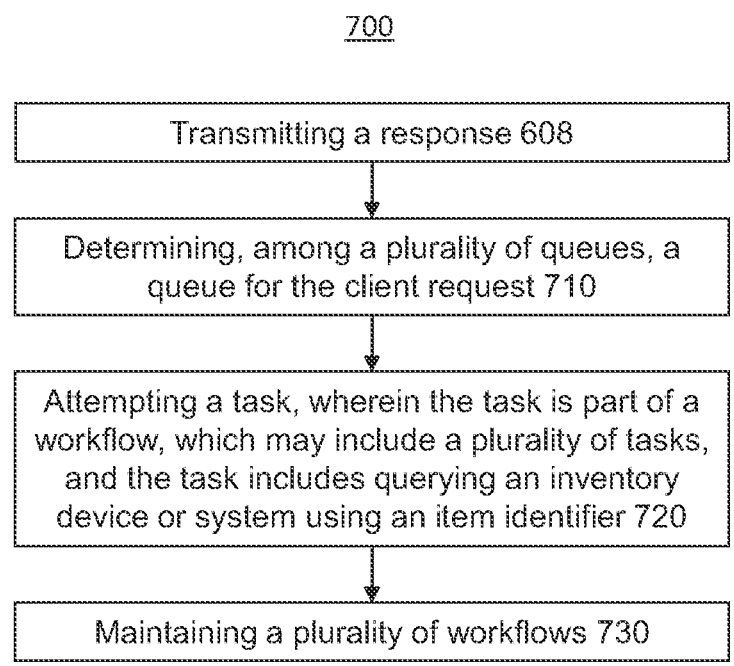
FIG. 7 illustrates a flowchart of an exemplary process for managing queues, consistent with disclosed embodiments.

FIG. 7 illustrates a flowchart of an exemplary process for managing queues, consistent with disclosed embodiments. At step 608, process 700 may proceed to step 710, rather than proceeding to step 610, as described with respect to FIG. 6. At step 608, computing device 402 may transmit a response, which may be transmitted to a remote client device 412, as described above. At step 710, process 700 may determine, among a plurality of queues, a queue for the client request. At step 720, process 700 may attempt a task, wherein the task is part of a workflow, which may include a plurality of tasks. In some embodiments, the task may include querying an inventory device or system using an item identifier. At step 730, process 700 may include maintaining a plurality of workflows, consistent with disclosed embodiments.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering, inserting, and/or deleting steps. It is intended, therefore, that the specification and examples be considered as illustrative only, with a true scope and spirit being indicated by the following claims and their full scope of equivalents.

What is claimed is:

1. A system for managing a client request, the system comprising:
   at least one processor; and
   a non-transitory computer-readable medium containing a set of instructions that, when executed by the at least one processor, cause the processor to perform steps comprising:
      receiving a client request received from a remote client device, the client request including request data comprising an item identifier;

based on the request data, determining, among a plurality of queues, a queue for the client request, the plurality of queues being associated with different workflows and the determined queue having at least one task associated with the item identifier;

asynchronously enqueuing the client request in the determined queue configured to analyze the client request;

attempting to execute the at least one task at a first time;

determining a first failure of the attempting at the first time;

attempting, at a second time, to execute the at least one task according to a designated number of re-attempts for the at least one task;

based on a result of the attempt of the at least one task at the second time, transmitting result information associated with the result to a response device; and based on the result of the attempt of the at least one task, performing a corrective action.

2. The system of claim 1, wherein the non-transitory computer-readable medium contains further instructions that, when executed by the at least one processor, cause the processor to determine whether at least one of an order number, an item identifier, or user identifier satisfies to a criterion.

3. The system of claim 1, wherein:
the request data comprises a request type identifier; and
the determined queue is determined based on the request type identifier.

4. The system of claim 3, wherein the request type identifier indicates at least one of: a cancelation request, a return request, an exchange request, or a delivery request.

5. The system of claim 1, wherein:
the remote client device generated the client request using an application programming interface (API); and
the API is configured to generate additional request data at the remote client device.

6. The system of claim 1, wherein the at least one task comprises querying an inventory system using the item identifier.

7. The system of claim 1, wherein at least one of the workflows is modifiable based on applying a model to the at least one workflow.

8. The system of claim 7, the steps further comprising:
accessing failure data associated with attempting the at least one task at the first or second time; and
performing at least one of:
altering at least one parameter of the model based on the failure data;
sending a notification to a manager device based on the failure data; or
prompting the remote client device for additional data.

9. The system of claim 7, wherein the non-transitory computer-readable medium contains further instructions that, when executed by the at least one processor, cause the processor to:
access failure data associated with attempting the at least one task at the first or second time; and
identify the failure data to be associated with at least one of a database, network communications, a logic error, or an API call error.

10. The system of claim 1, wherein the response device is the remote client device or is configured to alter at least one parameter of a model associated with a workflow associated with the determined queue.

11. The system of claim 1, wherein:
the client request is a first client request; and
wherein the non-transitory computer-readable medium contains further instructions that, when executed by the at least one processor, cause the processor to store first domain data based on the first client request in a relational database, the relational database storing second domain data from a second client request.

12. The system of claim 11, wherein the first domain data comprises data generated by the system based on the first client request.

13. The system of claim 11, the steps further comprising applying a model to the first and second domain data to determine a modification to at least one of a process, a service, a workflow, a module, a device configuration, or a system configuration.

14. The system of claim 1, wherein the non-transitory computer-readable medium contains further instructions that, when executed by the at least one processor, cause the processor to:
determine a resource usage of computing device; and
scale an amount of a resource for handling the client request based on the determined resource usage.

15. The system of claim 14, wherein scaling the amount of the resource comprises initializing a virtual computing resource.

16. A method for managing a client request, comprising:
receiving a client request received from a client device, the client request including request data comprising an item identifier;
based on the request data, determining, among a plurality of queues, a queue for the client request, the plurality of queues being associated with different workflows and the determined queue having at least one task associated with the item identifier;
asynchronously enqueuing the client request in the determined queue configured to analyze the client request;
attempting to execute the at least one task at a first time;
determining a first failure of the attempting at the first time;
attempting, at a second time, to execute the at least one task according to a designated number of re-attempts for the at least one task;
based on a result of the attempt of the at least one task at the second time, transmitting result information associated with the result to a response device; and
based on the result of the attempt of the at least one task, performing a corrective action.

17. The method of claim 16, wherein:
the client device generated the client request using an application programming interface (API); and
the API is configured to generate additional request data at the client device.

18. The method of claim 16, wherein the at least one task comprises querying an inventory system using the item identifier.

19. The method of claim 16, wherein at least one of the workflows is modifiable based on applying a model to the at least one workflow.

20. The method of claim 16, further comprising:
accessing failure data associated with attempting the at least one task at the first or second time; and
performing at least one of:
altering at least one parameter of the model based on the failure data;
sending a notification to a manager device based on the failure data; or prompting the remote client device for additional data.

\* \* \* \* \*